UNITED STATES PATENT OFFICE.

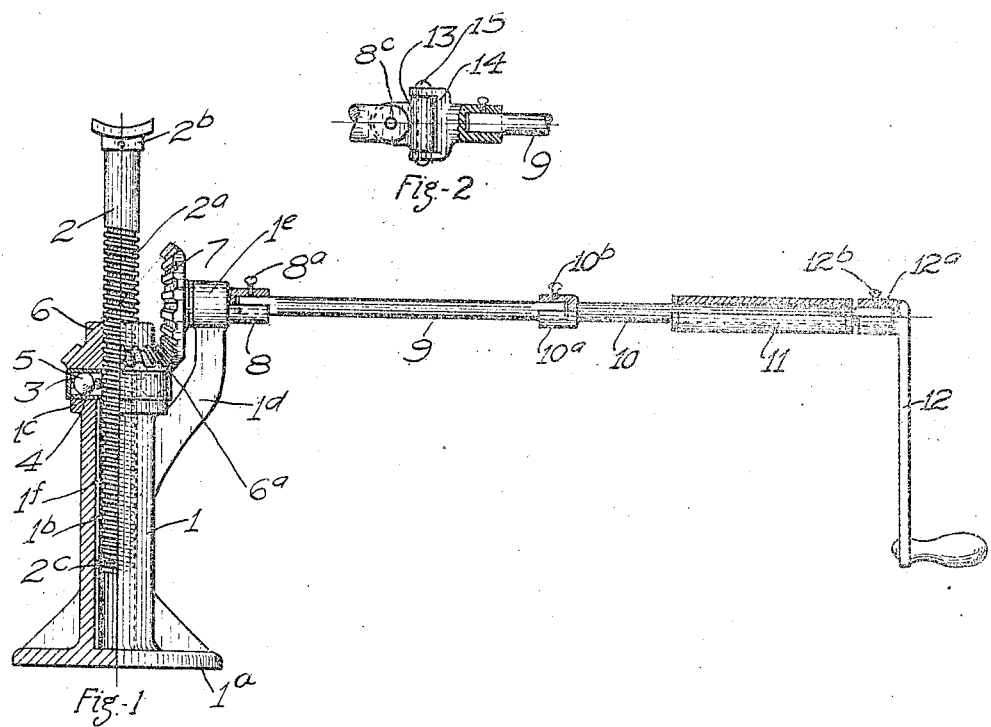

JOHN M. LYDICK, OF SAN DIEGO, CALIFORNIA.

JACKSCREW.

1,422,279.   Specification of Letters Patent.   Patented July 11, 1922.

Application filed April 27, 1920. Serial No. 376,916.

*To all whom it may concern:*

Be it known that I, JOHN M. LYDICK, a citizen of the United States, residing at San Diego, in the county of San Diego and State of California, have invented certain new and useful Improvements in Jackscrews, of which the following is a specification.

My invention relates to jack screws more particularly adapted for use in connection with automobiles and the objects of my invention are: First, to provide a vehicle jack screw which may be readily positioned under the axle casings of the vehicles for raising the same without the necessity of crawling under the vehicle or getting down into a stooping posture; second, to provide a vehicle jack screw of this class in which the article to be raised may be raised to any position and it will stand in such position; third, to provide a vehicle jack screw of this class which is operated by revoluble movement by means of a crank thus providing simplicity of operation; fourth, to provide a vehicle jack screw of this class in which the shaft is collapsible so that it may be placed in a compact form for carrying; fifth, to provide a vehicle jack screw of this class which is very efficient for raising and supporting a load; sixth, to provide a vehicle jack screw of this class with a universal joint in the shaft thus providing for shifting the shaft in varying directions to avoid obstacles and seventh, to provide a vehicle jack screw of this class which is very simple and economical of construction, durable, easy to operate, easy to install in position and which will not readily deteriorate or get out of order.

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of my vehicle jack screw showing portions broken and cut away and in section to facilitate the illustrations and Fig. 2 is a detailed side elevational view of a fragmentary portion of the shaft in slightly modified form from that of Fig. 1 and showing a portion broken away and in section to facilitate the illustration.

Similar characters of reference refer to similar parts and portions throughout the views of the drawings.

The base member 1, screw member 2, bearing casing 3, bearing plate 4, ball bearings 5, bevel gear 6, bevel gear 7, bevel gear axle 8, shaft member 9, shaft member 10, hand grip member 11 and crank 12 constitute the principal parts and portions of my vehicle jack screw.

The base member 1 is provided with an extended flange portion 1$^a$ adapted to rest on the ground or floor and it is provided with a central longitudinal hole 1$^b$ therein and on its upper end with an extended flange portion 1$^c$. It is provided on one side with an extending arm member 1$^d$ which extends outwardly and upwardly and on its upper end is provided a journal portion 1$^e$. Secured on the upper portion of the flange portion 1$^c$ is a plate 4 and mounted over this plate is a bearing casing 3 and positioned in this casing and resting on the plate 4 are a plurality of ball bearings 5. The casing 3 is secured on the lower face of the bevel gear 6. This bevel gear 6 is provided with a central hole which is provided with threads preferably square threads adapted for the threads 2$^a$ on the screw member 2. Secured on the upper end of this screw member 2 is a cap member 2$^b$ which is adapted to engage the article to be raised. In this case I have shown it curved to fit the curved axle casing of the vehicle axle casing. Secured in the lower end of the screw member 2 is a pin 2$^c$ which extends into a slot 1$^f$ in said base to prevent the turning of said screw member relatively to said base. Revolubly mounted in the journal 1$^e$ is an axle member 8, upon the one end of which is secured a bevel gear 7, which meshes with teeth 6$^a$ on the upper side of the bevel gear 6. The other end of this axle member 8 is provided with a square shaped socket in which is adapted to fit the one end of the shaft member 9 and it is held in position by means of a set screw 8$^a$. The other end of the shaft member 9 is rectangularly shaped and adapted to fit into a conforming socket member 10$^a$ and it is held in position by means of set screws 10$^b$. Revolubly mounted on the shaft member 10 is a sleeve 11 which serves as a hand grip for supporting the shaft and jack while turning the crank. The end of this shaft 10 is also rectangularly shaped and adapted to be mounted thereon is a conforming socket 12ª on the crank 12 and adapted to be secured thereon by means of a set screw 12ᵇ.

In the modified form of construction shown in Fig. 2 the axle member 8 is bifurcated at 8ª and pivotally connected thereto is a universal joint member 13 to which is pivotally connected another universal joint member 14 by means of a pin 15 and this member 14 is provided with a rectangularly shaped recess adapted to receive the shaft 9 thus providing for moving the end of the shaft at the crank in varying positions to avoid obstacles that might be in the way.

Though I have shown and described a particular construction, combination and arrangement of parts and portions and certain modifications thereof I do not wish to be limited to this particular construction, combination and arrangement, nor to the modified form thereof but desire to include in the purview of my invention the construction, combination and arrangement substantially as set forth in the appended claims.

It is obvious that with this construction there is provided a jack screw which may be readily positioned in under and out of the way places by the operator grasping the crank 12 and hand grip member 11 and thus supporting the jack screw place it in the position desired. After which, by holding the hand member 11 in one hand for supporting the jack screw and turning the crank 12 the article to be raised may be readily raised and that it will stand in any position left; that the jack screw may be readily removed by turning the crank in the opposite direction until the screw member 2ᵇ is released of the load and the jack screw removed; that the members 9, 10 and 12 may be quickly separated and the whole placed in compact form for carrying; that the bearings for supporting the bevel gear 6, provide a ball bearing for supporting the screw which will facilitate the operation of the jack screw.

Having thus described my invention what I claim as new and desire to secure by Letters Patent is:

1. A jack screw, including a base member provided with an integral sideways and upwardly extended side arm journal portions extending from one side thereof, a bevel gear with its lower face downwardly, supported on said base member and threaded internally, a screw member adapted to screw into said thread in said bevel gear, a bevel gear intermeshing with said first mentioned bevel gear journaled in said side arm on said base and means for revolving said bevel gear.

2. A jack screw, including a base member provided with an extended journal arm, a bevel gear with its lower face downwardly, supported on said base member threaded internally, a screw member adapted to screw into said thread in said bevel gear, a bevel gear intermeshing with said first mentioned bevel gear journaled in said journal arm on said base, means for revolving said bevel gear and ball bearing means between said bevel gear and the upper end of said base member adapted to facilitate its revolution relatively to said base member, and a lug secured to the lower end of said screw member reciprocably mounted in a notch in said base member, adapted to prevent the turning of said screw member in said base member.

In testimony whereof, I have hereunto set my hand at San Diego, California, this 17th day of April, 1920.

JOHN M. LYDICK.